US012715223B2

(12) United States Patent
Sakaoka

(10) Patent No.: US 12,715,223 B2
(45) Date of Patent: Aug. 25, 2026

(54) INKJET RECORDING APPARATUS

(71) Applicant: KYOCERA Document Solutions Inc., Osaka (JP)

(72) Inventor: Shinya Sakaoka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 180 days.

(21) Appl. No.: 18/636,091

(22) Filed: Apr. 15, 2024

(65) Prior Publication Data

US 2024/0351347 A1 Oct. 24, 2024

(30) Foreign Application Priority Data

Apr. 19, 2023 (JP) ................................ 2023-068456

(51) Int. Cl.
*B41J 2/175* (2006.01)
*B41J 2/18* (2006.01)
*B41J 2/19* (2006.01)

(52) U.S. Cl.
CPC ............ *B41J 2/19* (2013.01); *B41J 2/17513* (2013.01); *B41J 2/18* (2013.01)

(58) Field of Classification Search
CPC .... B41J 2/175; B41J 2/17506; B41J 2/17509; B41J 2/1752; B41J 2/17523; B41J 2/17556; B41J 2/17596; B41J 2/18; B41J 2/19; B41J 29/393
See application file for complete search history.

(56) References Cited

U.S. PATENT DOCUMENTS 7,651,193 B2 * 1/2010 Kawamoto ................ B41J 2/06 347/22
2014/0300672 A1 * 10/2014 Tsukamoto .............. B41J 2/175 347/89
2018/0072069 A1 * 3/2018 Hara .................... B41J 2/04541
2018/0170066 A1 * 6/2018 Ohtsu ........................ B41J 2/18
(Continued)

FOREIGN PATENT DOCUMENTS

JP 2007-021723 A 2/2007
JP 2007-137004 A 6/2007
(Continued)

OTHER PUBLICATIONS

An Office Action mailed by China National Intellectual Property Administration on Dec. 22, 2025, which corresponds to Chinese Patent Application No. 202410441767.1 and is related to U.S. Appl. No. 18/636,091; with English language translation.

*Primary Examiner* — Anh T Vo
(74) *Attorney, Agent, or Firm* — Studebaker Brackett PLLC

(57) ABSTRACT

An inkjet recording apparatus includes a plurality of liquid tank, a pressure decreasing device, a circulation flow pass, a circulating device, a recording head, and a control device. The ink tanks store a liquid. The pressure decreasing device decreases pressure in the liquid tanks. The circulation flow pass is provided in each of the liquid tanks and communicates different positions of the liquid tank. The circulation device circulates the liquid through the circulation flow passes. The recording head ejects the liquid supplied from the liquid tanks. The control device selects the liquid tank for supplying the liquid to the recording head based on an amount of dissolved gas in the liquid tanks.

4 Claims, 3 Drawing Sheets

(56) References Cited

U.S. PATENT DOCUMENTS

| | | | | |
|---|---|---|---|---|
| 2019/0092034 | A1* | 3/2019 | Goto | B41J 2/175 |
| 2019/0263135 | A1 | 8/2019 | Abe et al. | |
| 2020/0180320 | A1 | 6/2020 | Abe et al. | |
| 2022/0072866 | A1 | 3/2022 | Abe et al. | |

FOREIGN PATENT DOCUMENTS

| | | | |
|---|---|---|---|
| JP | 2010-162821 | A | 7/2010 |
| JP | 2019-142189 | A | 8/2019 |

* cited by examiner

INKJET RECORDING APPARATUS

INCORPORATION BY REFERENCE

This application is based on and claims the benefit of priority from Japanese patent application No. 2023-068456 filed on Apr. 19, 2023, which is incorporated by reference in its entirety.

BACKGROUND

The present disclosure relates to an inkjet recording apparatus.

In an inkjet recording apparatus, when an amount of dissolved gas of ink increases, bubbles may be generated inside a recording head, causing an ejection failure. Therefore, a technique for decreasing the amount of dissolved gas in ink has been studied. For example, there has been proposed a configuration in which ink in an ink tank is stirred under a state where pressure in the ink tank is decreased to degas the ink.

In the above degassing device, the ink in the ink tank is stirred, and the ink is degassed near the liquid surface. However, since the stirrer is located at the bottom of the ink tank, when an ink capacity increases, it becomes difficult to replace the ink near the liquid surface where the amount of dissolved gas is small with the ink near the bottom surface where the amount of dissolved gas is large, and degassing efficiency is lowered.

SUMMARY

An inkjet recording apparatus according to the present disclosure includes a plurality of liquid tank, a pressure decreasing device, a circulation flow pass, a circulating device, a recording head, and a control device. The ink tanks store a liquid. The pressure decreasing device decreases pressure in the liquid tanks. The circulation flow pass is provided in each of the liquid tanks and communicates different positions of the liquid tank. The circulation device circulates the liquid through the circulation flow passes. The recording head ejects the liquid supplied from the liquid tanks. The control device selects the liquid tank for supplying the liquid to the recording head based on an amount of dissolved gas in the liquid tanks.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
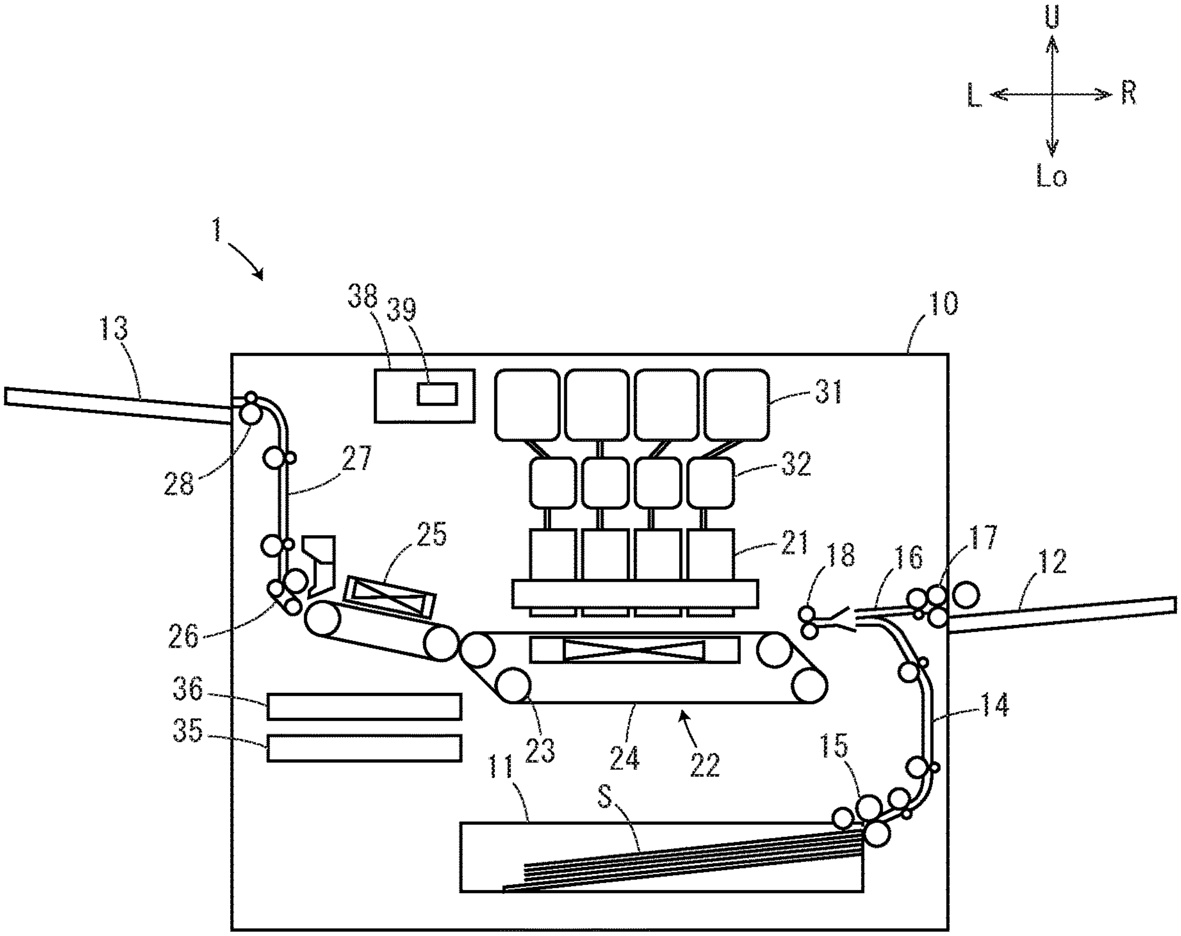
FIG. 1 is a schematic view showing an inkjet recording apparatus according to one embodiment of the present disclosure.

Hereinafter, with reference to the drawings, an inkjet recording apparatus 1 of the present embodiment will be described. FIG. 1 is a schematic view showing the inkjet recording apparatus 1 according to the present embodiment. For convenience of explanation, the front side of the paper surface on which FIG. 1 is drawn is defined as the front side of the inkjet recording apparatus 1, and the left-and-right direction will be described with reference to the direction in which the inkjet recording apparatus 1 is viewed from the front side. The arrows L, R, U, and Lo attached to each figure indicate the left, right, upper, and lower sides of the inkjet recording apparatus 1, respectively.

An inkjet recording apparatus 1 ejects ink from each inkjet recording head 21 toward a sheet S as a recording medium and performs printing. The inkjet recording apparatus 1 includes a box-shaped housing 10 in which various kinds of device are housed. In the lower portion of the housing 10, a sheet feeding cassette 11 in which the sheet S is set is housed, and a manual sheet feeding tray 12 on which the sheet S is set by hand is installed on the right side surface of the housing 10. On the upper portion of the left side surface of the housing 10, a sheet discharge tray 13 on which the recorded sheet S is stacked is installed.

In the right side portion in the housing 10, a first conveyance path 14 along which the sheet S is conveyed from the sheet feeding cassette 11 to the recording head 21 provided in the center of the housing 10 is formed. On the upstream side of the first conveyance path 14, a first sheet feeding part 15 which feeds the sheet S from the sheet bundle in the sheet feeding cassette 11 is provided, and a registration roller 18 which adjusts the feeding timing of the sheet S is provided in the downstream portion of the first conveyance path 14. Further, a sheet feeding path 16 of the manual sheet feeding tray 12 is merged with the downstream portion of the first conveyance path 14, and a second sheet feeding part 17 which feeds the sheet S from the sheet bundle on the manual sheet feeding tray 12 is provided on the sheet feeding path 16.

On the downstream side of the registration roller 18, a conveying device 22 and the recording head 21 provided for each color (for example, black, cyan, magenta, and yellow) are installed. The registration roller 18 corrects the skew of the sheet S and then sends the sheet S to the conveying device 22 in accordance with the ink ejecting operation by each recording head 21. In the housing 10, an ink container 31 and an ink tank 32 for each recording head 21 are provided. The ink of each ink container 31 is temporarily stored in the ink tank 32, the ink is degassed as necessary, and then the ink is supplied from the ink tank 32 to the recording head 21.

The conveying device 22 is constituted by winding a conveyance belt 24 around a plurality of tension rollers 23 installed below the recording heads 21. On the downstream side of the conveying device 22, a drying device 25 which dries the ink of the sheet S is provided. On the downstream side of the drying device 25, a decurl device 26 which corrects the curl generated on the sheet S by drying the ink is provided. On the downstream side of the decurl device 26, a second conveyance path 27 along which the sheet S is conveyed toward the sheet discharge tray 13 is formed. In the downstream portion of the second conveyance path 27, a sheet discharge part 28 which discharges the recorded sheet S to the sheet discharge tray 13 is provided.

Below the drying device 25, a maintenance unit 35 which cleans the recording heads 21 and a cap unit 36 which caps the recording heads 21 are provided. The maintenance unit 35 is provided with a squeegee-shaped wiping blade, and the wiping blade scrapes the ink remaining on the nozzle surface of the recording head 21. The cap unit 36 is provided with a head cap, and the nozzle surface of the recording head 21 is capped with the head cap. The head cap suppresses drying of the ink in the nozzle. The drying of the ink in the nozzle may be further suppressed by storing a liquid such as a cleaning liquid in the head cap.

Further, the inkjet recording apparatus 1 is provided with a control device 38 for controlling the entire apparatus. The control device 38 may be composed of a processor or a logic circuit (hardware) formed in an integrated circuit or the like. In the case of a processor, the processor reads and executes a program stored in a memory, and various processes are executed. For example, a CPU (Central Processing Unit) is used as the processor. The memory is constituted by one or more storage devices such as a ROM (Read Only Memory), a RAM (Random Access Memory) or the like depending on the application.

At the time of image recording, the sheet S is fed from the sheet feeding cassette 11 and the manual sheet feeding tray 12 by the first sheet feeding part 15 and the second sheet feeding part 17, respectively, and then sent to the registration roller 18. In accordance with the ejecting timing of the ink, the sheet S is conveyed from the registration roller 18 to the conveyance belt 24, the degassed ink is ejected from each recording head 21, and a color image is recorded on the surface of the sheet S. The sheet S is dried by the drying device 25, and the curl of the sheet S is corrected by the decurl device 26. The sheet S is conveyed to the sheet discharge part 28 through the second conveyance path 27, and the recorded sheet S is discharged to the sheet discharge tray 13 by the sheet discharge part 28.

By the way, the liquid surface of the ink touches the air in the ink tank 32, and the dissolving of the air proceeds, and the nozzle of the recording head 21 may be clogged by bubbles in the ink. Therefore, it is desired to appropriately keep an amount of dissolved gas in the ink. For example, a method has been proposed in which by passing the ink through the hollow fiver filter in a state where the pressure of the circumference of the hollow fiber filter is decreased, the air is moved from the wall surface of the hollow fiber to the pressure decreased side to degas the ink. This method requires the expensive hollow fiber filter and requires periodic replacement operations, which increase cost.

In order to prevent the clogging of the nozzle, a method (hereinafter referred to as the stirring degassing method) has been proposed in which the ink is stirred by the stirrer in a state in which the pressure in the ink tank 32 is decreased below an atmospheric pressure to degas the ink. In the stirring degassing system, a magnetic force is externally applied to the stirrer in the ink tank 32, and the stirrer is rotated by the magnetic force to stir the ink in the ink tank 32. When the depth of the ink and the tank diameter are large, the ink is difficult to be stirred, and the degassing efficiency is lowered. As the rotational speed of the stirrer is increased, the stirring becomes easier, but when the rotational speed of the stirrer becomes too high, a detuning phenomenon occurs and the rotational sound of the stirrer becomes large. Therefore, in the present embodiment, a circulating degassing method shown below is adopted.

[Degassing Device] The inkjet recording apparatus according to the present embodiment includes a plurality of the liquid tank (for example, the ink tanks 32A, 32B) in which liquid (for example, the ink) is stored, a pressure decreasing device (for example, a decreasing pump 62) which decreases the pressure in the ink tanks, circulation flow passes 47, 47A, 47B, 47AA, and 47BB each of which is provided for each ink tank and communicates difference positions of the liquid tank, a circulation device (for example, a circulation pump 67) which circulates the liquid through the circulation flow passes 47, 47A, 47B, 47AA, and 47BB, the recording heads 21 which eject the liquid supplied from the liquid tanks, and the control device 38 which selects the ink tank for supplying the liquid to the recording head 21 based on an amount of dissolved gas in the liquid tanks. Specifically, they will be described as follows. In this embodiment, an amount of dissolved oxygen is used as the amount of dissolved gas.

Figure 2:
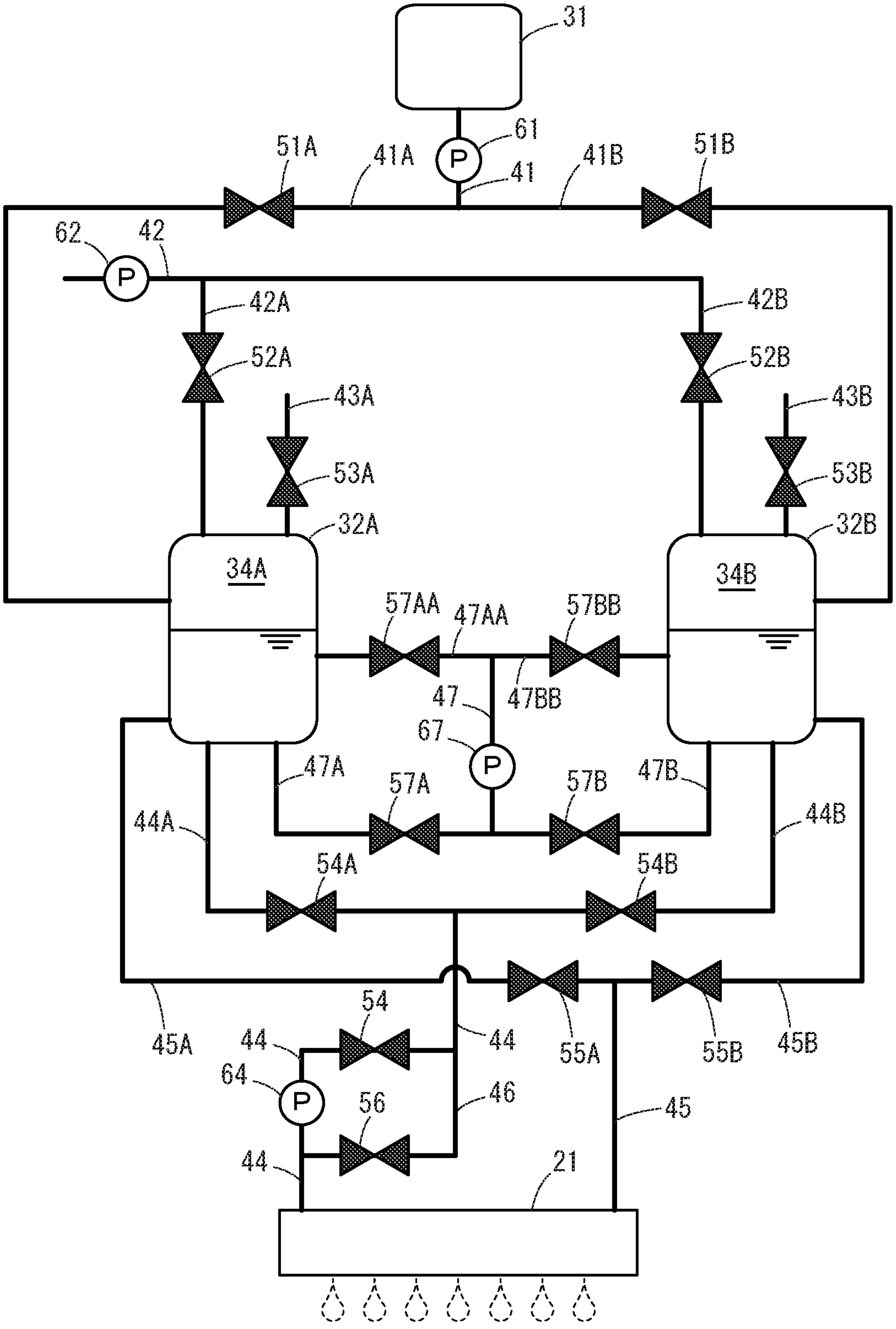
FIG. 2 is a schematic view showing an ink supply mechanism according to the embodiment of the present disclosure.

FIG. 2 is a schematic view showing an ink supply mechanism according to the present embodiment. Although the inkjet recording apparatus 1 according to the present embodiment is provided with the ink supply mechanism for each color of the ink, one ink supply mechanism will be described here because these ink supply mechanisms have the same configuration.

[Ink Tank] The ink tanks 32A, 32B each has a shape in which an upper end portion and a lower end portion of a cylinder whose axial direction is along the upper-and-lower direction are closed, for example. The horizontal cross section of each of the ink tanks 32A, 32B is preferably circular.

FIG. 1 and the others are schematically drawn, and the recording head 21 is actually disposed above the ink tanks 32A, 32B. A negative pressure is applied to the ink in the recording head 21 by a head difference from the ink in each of the ink tanks 32A, 32B, and a meniscus is formed in the nozzle of the recording head 21 by the negative pressure. After the ink is ejected from the recording head 21, the surface tension of the ink acts to reduce the surface area of the meniscus, and the resulting negative pressure draws the reduced amount of the ink from each of the ink tanks 32A, 32B into the recording head 21.

[Replenishment Flow Pass] A replenishment flow pass 41 blanches into a replenishment flow pass 41A and a replenishment flow pass 41B. The replenishment flow passes 41A, 42B are connected to the ink tanks 32A, 32B, respectively. A replenishment pump 61 is provided on the replenishment flow pass 41. On the replenishment flow passes 41A, 41B, replenishment valves 51A, 51B are provided, respectively.

[Air Release Flow Pass] An air release flow pass 43A is connected to the top portion of the ink tank 32A and communicates with an upper space 34A, which is a space above the liquid level in the ink tank 32A. On the air release flow pass 43A, an air release valve 53A is provided. An air release flow pass 43B is connected to the top portion of the ink tank 32B and communicates with an upper space 34B, which is a space above the liquid surface in the ink tank 32B. On the air release flow pass 43B, an air release valve 53B is provided.

[Pressure Decreasing Flow Pass] A pressure decreasing flow pass 42 branches into a: pressure decreasing flow pass 42A and a pressure decreasing flow pass 42B. The pressure decreasing flow pass 42A is connected to the top portion of the ink tank 32A and communicates with the upper space 34A of the ink tank 32A. The pressure decreasing flow pass 42B is connected to the top portion of the ink tank 32B and communicates with the upper space 34B of the ink tank 32B. A pressure decreasing pump 62 is provided on the pressure decreasing flow pass 42. Pressure decreasing valves 52A, 52B are provided on the pressure decreasing flow passes 42A, 42B, respectively.

[Supply Flow Pass] Supply flow passes 44A, 44B are connected to the ink tanks 32A, 32B, respectively. The supply flow passes 44A, 44B are merged with a supply flow pass 44. The supply flow pass 44 is connected to the recording head 21. Supply valves 54A, 54B are provided on the supply flow passes 44A, 44B, respectively. On the supply flow pass 44, a supply valve 54 and a supply pump 64 are provided.

[Recovery Flow Pass] Recovery flow passes 45A, 45B are connected to the ink tanks 32A, 32B, respectively. The recovery flow passes 45A, 45B are merged with a recovery flow pass 45. The recovery flow pass 45 is connected to the recording head 21. On the recovery flow passes 45A, 45B, recovery valves 55A, 55B are provided, respectively.

[Bypass Flow Pass] The supply flow pass 44 includes a bypass flow pass 46 bypassing the supply valve 54 and the supply pump 64. On the bypass flow pass 46, a bypass valve 56 is provided.

[Circulation Flow Pass] The circulation flow passes 47A, 47B are connected to the bottom portions of the ink tanks 32A, 32B, respectively. On the circulation flow passes 47A, 47B, circulation valves 57A, 57B are provided, respectively. The circulation flow passes 47A, 47B are merged with a circulation flow pass 47. On the circulation flow pass 47, a circulation pump 67 is provided. The circulation flow pass 47 branches into the circulation flow passes 47AA, 47BB. The circulation flow passes 47AA, 47BB are connected to the ink tanks 32A, 32B at positions above the bottoms of the ink tanks 32A, 32B, respectively. On the circulation flow passes 47AA, 47BB, circulation valves 57AA, 57BB are provided, respectively.

[Control device] Each of the above pumps and valves is controlled by the control device 38 (see FIG. 1). The control device 38 includes a determination part 39 which determines the necessity of the degassing operation in accordance with a leaving time of the ink.

Next, the basic operation of the degassing device 40 will be described. Since the operation of the degassing device 40 for the ink tank 32A and the operation of the degassing device 40 for the ink tank 32B are the same, the operation of the ink tank 32A will be described below. The operation for the ink tank 32B will be explained by reading "A" at the end of the numeral into "B".

[Standby State] In the standby state of the ink tank 32A, the air release valve 53A, the supply valve 54A, the recovery valve 55A, and the bypass valve 56 are only opened. The ink is stored in the ink tank 32A, the liquid surface touches the air in the upper space 34A opened to the atmosphere, and then the air is dissolved in the ink with the lapse of time.

In the standby state, the determination part 39 of the control device 38 determines whether the degassing is necessary. For example, the control device 38 is provided with a timer, and the leaving time of the ink is measured by the timer. An amount of dissolved gas of the ink can be estimated from one or more parameters such as an atmospheric pressure, a temperature of the ink, and an elapsed time from the last printing. Therefore, the determination part 39 stores conversion information indicating a correspondence relationship between each parameter and the amount of dissolved gas of the ink, and estimates the amount of dissolved gas of the ink based on each parameter. In addition, the determination part 39 stores conversion information indicating a correspondence relationship between the amount of dissolved gas of the ink and the allowable time, and the allowable time is set based on the amount of dissolved gas of the ink. The allowable time is a time during which the printing is allowed without degassing even if the ink is left. For the conversion information indicating the correspondence relationship between each parameter and the amount of dissolved gas of the ink and the conversion information indicating the correspondence relationship between the amount of dissolved gas of the ink and the allowable time, map data, a lookup table, a conversion equation, and the like are used. These map data, lookup table, and conversion equation are obtained experimentally, empirically, and theoretically in advance.

When the leaving time of the ink is within the allowable time, the determination part 39 determines that the degassing is unnecessary because an oxygen saturation degree is low. When the leaving time of the ink exceeds the allowable time, the determination part 39 determines that the degassing is necessary because the oxygen saturation degree is high. If the degassing is necessary, the control device 38 performs the pressure decreasing process.

[Pressure Decreasing Process] In the pressure decreasing process, the control device 38 opens only the pressure decreasing valve 52A, and drives the pressure decreasing pump 62. Then, the air is sucked out from the upper space 34A of the ink tank 32A, and the upper space 34A is decreased in pressure. The control device 38 stops the pressure decreasing pump 62 when the atmospheric pressure in the upper space 34A indicated by a barometer (not shown) reaches a target value (for example, −50 [kPa]).

[Degassing Process] When the pressure decreasing process is completed, the control device 38 performs the degassing process. In the degassing process, the control device 38 opens the circulation valves 57A, 57AA only, and drives the circulation pump 67 for a predetermined time. When the circulation pump 67 is driven, the ink in the ink tank 32A circulates through the circulation flow passes 47A, 47, and 47AA. The ink near the bottom surface of the ink tank 32A where an amount of dissolved gas is large flows out into the circulation flow pass 47, and the ink in the circulation flow pass 47 flows into the vicinity of the liquid surface in the ink tank 32A. The liquid surface of the ink is exposed to the decreased pressure atmosphere to remove the air dissolved in the ink near the liquid surface. By smoothly replacing the ink near the liquid surface where an amount of dissolved gas is small with the ink near the bottom surface where an amount of dissolved gas is large, the degassing efficiency is improved. In addition, unlike the stirring degassing type, the depth of the ink and the tank diameter are not affected, and the driving sound of the circulation pump 67 is more suppressed than the rotating sound of the stirrer, and the quietness is enhanced.

[Head Circulation Process] A head circulation process may be performed before or after the degassing process or may be performed at a unique timing. In the head circulation process, the control device 38 opens the air release valve 53A, the supply valves 54A, 54, and the recovery valve 55A only, and drives the supply pump 64. Then, the ink is supplied from the ink tank 32A to the recording head 21 through the supply flow passes 44A, 44, and the ink is recovered from the recording head 21 to the ink tank 32A through the recovery flow passes 45, 45A. By circulating the ink between the recording head 21 and the ink tank 32A, the ink with increased viscosity in the recording head 21 is replaced and bubbles are removed from the recording head 21.

[Printing Process] During the printing operation by the recording head 21, the air release valve 53A, the supply valve 54A, the recovery valve 55A, and the bypass valve 56 are only opened. That is, during the printing operation, the ink tank 32A is released to the atmosphere and has the atmospheric pressure. During the printing operation, the pressure in the ink tank 32A is not decreased such that substantial degassing does not occur. Every time when the ink is ejected from the recording head 21, the ink is supplied from the ink tank 32A to the recording head 21 through the bypass flow pass 46 and the recovery flow passes 45A, 45. In some cases, the ink is replenished in the middle of ink replacement operation, printing operation, or the like. During the ink replenishment operation, the replenishment valve 51 is opened and the replenishment pump 61 is driven. The ink is replenished from the ink container 31 to the ink tank 32A through the replenishment flow pass 41 by driving the replenishment pump 61.

FIG. 1 and the others are schematically drawn, and the recording head 21 is actually disposed above the ink tank 32A. A negative pressure is applied to the ink in the recording head 21 by a head difference from the ink in the ink tank 32A, and a meniscus is formed in the nozzle of the recording head 21 by the negative pressure. After the ink is ejected from the recording head 21, the surface tension of the ink acts to reduce the surface area of the meniscus, and the resulting negative pressure draws the reduced amount of the ink from the ink tank 32A into the recording head 21. The recovery valve 55A may be closed, and the ink may be supplied to the recording head 21 only from the bypass flow pass 46.

If the pressure in the ink tank 32A, 32B are decreased to the extent that substantial degassing occurs in a state where the recording head 21 and the ink tanks 32A, 32B are connected, the meniscus of the nozzle may be destroyed. Even if the meniscus is not destroyed, there is a risk that the shape of the meniscus in the nozzle is changed compared with the case where the ink tanks 32A, 32B are released to the atmosphere, and the ejecting characteristics of the ink is changed. On the other hand, in the present embodiment, while the pressure decreasing process and the degassing process are performed in one of the ink tanks 32A, 32B, the printing process can be performed in the other of the ink tanks 32A, 32B. In this case, since the other of the ink tanks 32A, 32B is not decreased in pressure so as not to cause substantial degassing, the meniscus in the nozzle of the recording head 21 is not destroyed, and since its shape is not changed, the ejection characteristics are not changed.

Figure 3:
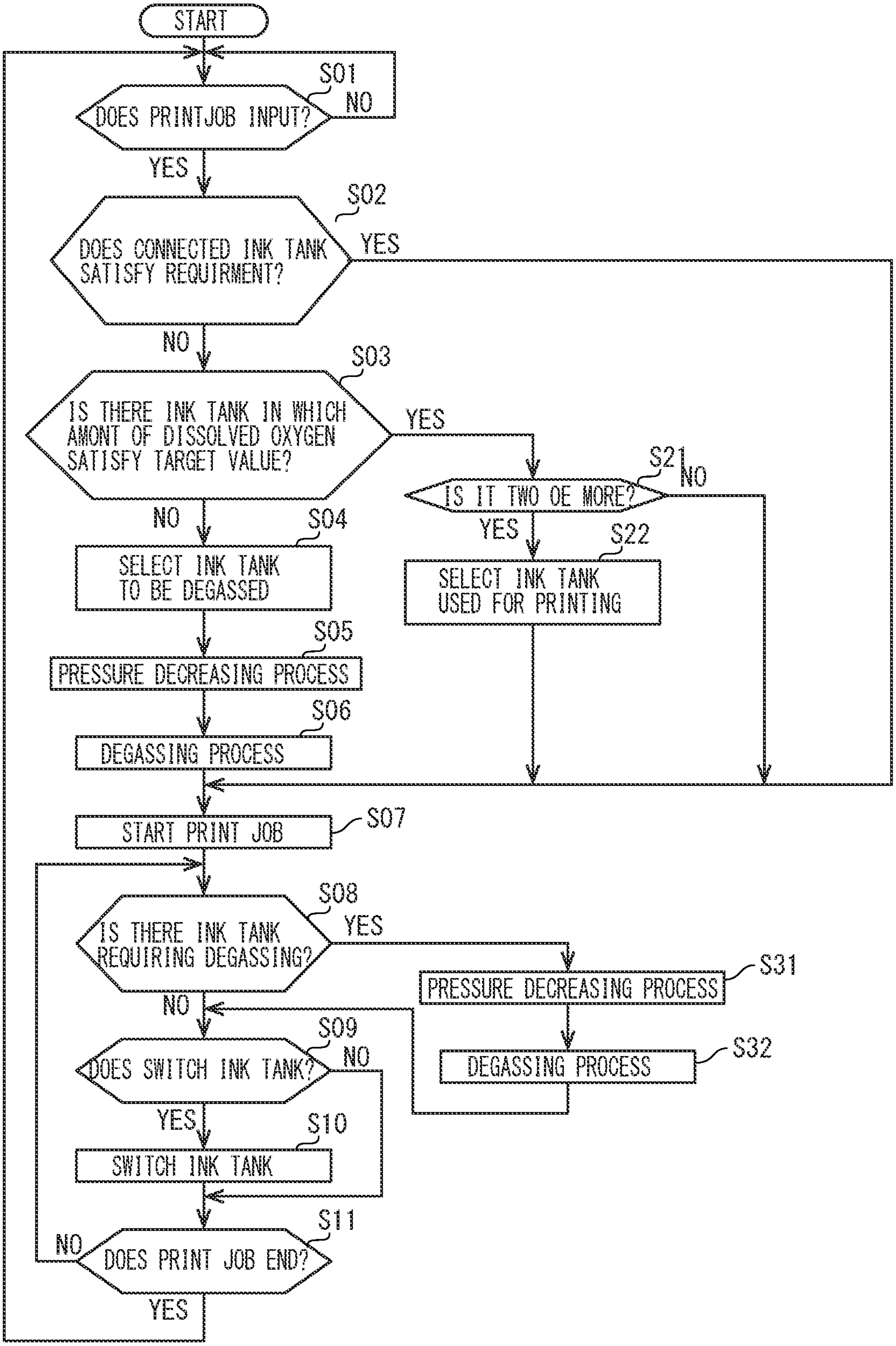
FIG. 3 is a flowchart showing an operation of a degassing device according to the embodiment of the present disclosure.

Next, the features of this embodiment will be described in detail. FIG. 3 is a flowchart showing an operation of the degassing device 40. First, the control device 38 determines whether the print job is input to the inkjet recording apparatus 1 (step S01). When the print job is not input (step S01: NO), the control device 38 repeats the determination in step S01. On the other hand, when the print job is input (step S01: YES), the control device 38 determines whether the ink tank connected to the recording head 21 satisfies requirements (step S02).

Here, "the ink tank connected to the recording head 21" refers to an ink tank in which the air release valve 53A or 53B, the supply valve 54A or 54B, the recovery valve 55A or 55B, and the bypass valve 56 are opened and ready to supply the ink to the recording head 21, among the ink tanks 32A, 32B. The ink tank connected to the recording head 21 may be an ink tank connected to the recording head 21 at the last print job, or it may be an ink tank connected to the recording head 21 as an initial setting at the time of turning on the power or canceling the sleep mode.

"The requirement" has two points: an amount of dissolved oxygen of the ink does not exceed a target value during the performing of the print job, and an amount of remaining ink is an amount required to complete the print job. Here, the amount of dissolved oxygen of the ink is obtained by prediction or measurement. For example, the amount of dissolved oxygen can be predicted from at least one of the following numerical values: an environmental temperature, an environmental pressure, a time elapsed since the ink container 31 is attached, a density of the image in the print job, and the like. For example, in the case of low temperature and low pressure, the amount of dissolved oxygen is small because the amount of saturated dissolved oxygen is small. In addition, since the ink is degassed when the ink container 31 is attached, the amount of dissolved oxygen is small in a case where the time elapsed from the attaching is short. In addition, when the density of the image is high, the amount of dissolved oxygen is small because the ink is actively supplied from the ink container 31. The measurement of the amount of dissolved oxygen is carried out by a bubble sensor provided in the circulation flow pass 47 or the like. There are three main types of the bubble sensor: photoelectric, capacitive, and ultrasonic, but the ultrasonic type is the most accurate.

When the selected ink tank satisfies the requirements (step S02: YES), the control device 38 starts the print job (step S07). On the other hand, when the selected ink tank does not satisfy the requirements (step S02: NO), the control device 38 determines whether there is an ink tank in which the amount of dissolved oxygen meets a target value (step S03).

When there is no ink tank in which the amount of dissolved oxygen meets the target value (step S03: NO), the control device 38 selects an ink tank to be degassed (step S04). Specifically, the control device 38 selects an ink tank that can complete the degassing most quickly. For example, the control device 38 may select an ink tank in which an amount of the remaining ink is smallest. Alternatively, at least one of the ink tanks may have a different capacity from the other ink tanks. In this case, the control device 38 may select the ink tank with the smallest capacity among the ink tanks. Subsequently, the control device 38 performs the above pressure decreasing process (step S05) and the degassing process (step S06), and then starts the print job (step S07).

On the other hand, in step 03, when there is an ink tank in which an amount of the dissolved oxygen meets the target value (step S03: YES), the control device 38 determines whether there are two or more ink tanks in which an amount of the dissolved oxygen meets the target value (step S21). When there are two or more ink tanks in which an amount of the dissolved oxygen meets the target value (step S21: YES), the control device 38 selects the ink tank to be used for printing (step S22). The ink tank used for printing is determined on the basis of at least one item of an amount of dissolved oxygen in the ink, an amount of the remaining ink, and a state of connection to the recording head 21.

For example, the ink tank having the largest number of satisfied may items be selected. Alternatively, the ink tank having the smallest amount of dissolved oxygen may simply be selected, and the ink tank having the largest amount of remaining ink may be Alternatively, when two or more ink tanks selected. meet the target values of the amount of dissolved oxygen and the amount of remaining ink, the ink tank connected to the recording head 21 may be selected. Alternatively, when two or more ink tanks meet the target values of the amount of dissolved oxygen and the amount of remaining ink, the ink tank having a small amount of dissolved oxygen or the ink tank having a large amount of remaining ink may be selected.

When there are not more than two ink tanks in which an amount of dissolved oxygen meets the target value (step S21: NO), because there is one ink tank in which an amount of dissolved oxygen meets the target value, the control device 38 selects this ink tank.

After the start of the print job, the control device 38 determines whether there is an ink tank requiring the degassing (step S08). The determination part 39 determines whether the degassing is necessary in the same manner as the determination in the standby state described above. When there is the ink tank requiring the degassing (step S08: YES), the control device 38 performs the pressure decreasing process (step S31) and the degassing process (step S32). On the other hand, when there is no ink tank requiring the degassing (step S08: NO), the control device 38 determines whether the ink tank is switched (step S09).

Specifically, when the amount of remaining ink in the ink tank used for the printing becomes less than the target value and when the amount of dissolved oxygen exceeds the target value, the switching of the ink tank is required. When switching the ink tank (step S09: YES), the control device 38 switches the ink tank to one in which the amount of remaining ink and the amount of dissolved oxygen meet the target values (step S10). Next, the control device 38 determines whether the print job is finished (step S11). When the print job is finished (step S11: YES), the control device 38 repeats the steps after step S01, and when the print job is not finished (step S11: NO), the control device 38 repeats the steps after step S08.

The inkjet recording apparatus 1 according to the embodiment described above includes; a plurality of the liquid tanks (for example, the ink tanks 32A, 32B) in which the liquid (for example, the ink) is stored; the pressure decreasing device (for example, the pressure decreasing pump 62) which decreases the pressure of the inside of liquid tanks; the circulation flow passes 47, 47A, 47B, 47AA and 47BB provided in each of the liquid tanks and communicating different positions of the liquid tank; the circulation device (for example, the circulation pump 67) which circulates the liquid through the circulation flow passes 47, 47A, 47B, 47AA, and 47BB; the recording heads 21 which eject the liquid supplied from the liquid tanks; and the control device 38 which selects the liquid tank for supplying the liquid to the recording head 21 based on the amount of dissolved gas in the liquid tanks. According to this configuration, even if an amount of the liquid is large, it can be efficiently degassed with a simple configuration.

In addition, according to the inkjet recording apparatus 1 according to the present embodiment, when there is a plurality of the liquid tanks in which an amount of dissolved gas meets the target value, the control device 38 selects the liquid tank based on at least one of the amount of dissolved gas, the amount of remaining liquid, and the state of connection to the recording head 21. According to this configuration, an appropriate liquid tank can be selected.

According to the inkjet recording apparatus 1 according to the present embodiment, when there is no liquid tank in which an amount of dissolved gas meets the target value, the control device 38 degasses one of the liquid tanks by using the pressure decreasing device and the circulation device. According to this configuration, the inkjet recording apparatus 1 can be restored to a printable state.

In addition, according to the inkjet recording apparatus 1 according to the present embodiment, the control device 38 degasses the liquid tank which completes the degassing earliest, among the liquid tanks. According to the configuration, it becomes possible to shorten a time during which the printing cannot be performed.

According to the inkjet recording apparatus 1 according to the present embodiment, at least one of the liquid tanks has a different capacity from the other liquid tanks, and the control device 38 degasses the liquid tank having the smallest capacity. According to the configuration, it becomes possible to shorten a time during which the printing cannot be performed.

The above embodiment may be modified as follows.

[Another modified Example] In the above embodiment, an example in which the degassing device 40 is provided in the inkjet recording apparatus 1 is shown, but the degassing device 40 can also be applied to a device used in other fields such as a semiconductor manufacturing field and a display manufacturing field. That is, it can be applied to degas chemical solutions electrolytic solutions, liquid resins, adhesives, solvents, lubricating oils, liquid foods, serum, and the like, other than the ink.

In the above embodiment, the pressure decreasing pump 62 is exemplified as the pressure decreasing device, but the pressure decreasing device may be a device capable of decreasing the pressure in the ink tank 32, for example, the pressure decreasing device may be an ejector.

In the above embodiment, the circulation pump 67 is exemplified as the circulation device, but the circulation device may be a device capable of circulating the ink through the circulation flow pass 47, for example, the circulation device may be an ejector.

The invention claimed is:

1. An inkjet recording apparatus comprising:

a plurality of liquid tank in which a liquid is stored;

a pressure decreasing device which decreases pressure in the liquid tanks;

a circulation flow pass provided in each of the liquid tanks and communicating different positions of the liquid tank;

a circulation device which circulates the liquid through the circulation flow passes;

a recording head which ejects the liquid supplied from the liquid tanks; and a control device which selects the liquid tank for supplying the liquid to the recording head based on an amount of dissolved gas in the liquid tanks, wherein when there is no liquid tank in which an amount of dissolved gas meets a target value, the control device degasses one of the liquid tanks by using the pressure decreasing device and the circulation device.

2. The inkjet recording apparatus according to claim 1, wherein when there is a plurality of the liquid tanks in which an amount of dissolved gas meets a target value, the control device selects the liquid tank based on at least one of the amount of dissolved gas, an amount of remaining liquid, and a state of connection to the recording head.

3. The inkjet recording apparatus according to claim 1, wherein the control device degasses the liquid tank which completes degassing earliest, among the liquid tanks.

4. The inkjet recording apparatus according to claim 3, wherein at least one of the liquid tanks has a different capacity from the other liquid tanks, and the control device degasses the liquid tank having the smallest capacity.

* * * * *